United States Patent
Liang et al.

(10) Patent No.: US 11,970,425 B2
(45) Date of Patent: Apr. 30, 2024

(54) LIQUID REGULATOR FOR ULTRA-DISPERSED, HIGH-MUD-RESISTANCE, HIGH-FOAM-STABILITY, LOW-SHRINKAGE AND ENHANCED AUTOCLAVED AERATED CONCRETE, AND PREPARATION METHOD AND APPLICATION THEREOF

(71) Applicant: Chongqing Juwei Energy Saving Building Materials Co., LTD, Chongqing (CN)

(72) Inventors: Huaguo Liang, Chongqing (CN); Hu Xie, Chongqing (CN); Sinan Wu, Chongqing (CN)

(73) Assignee: Chongqing Juwei Energy Saving Building Materials Co., LTD, Chongqing (CN)

( * ) Notice: Subject to any disclaimer, the term of this patent is extended or adjusted under 35 U.S.C. 154(b) by 23 days.

(21) Appl. No.: 18/320,307

(22) Filed: May 19, 2023

(65) Prior Publication Data
US 2023/0286857 A1    Sep. 14, 2023

Related U.S. Application Data

(63) Continuation of application No. PCT/CN2022/120791, filed on Sep. 23, 2022.

(51) Int. Cl.
*C04B 7/26* (2006.01)
*C04B 103/00* (2006.01)
*C04B 111/34* (2006.01)

(52) U.S. Cl.
CPC ........ *C04B 7/26* (2013.01); *C04B 2103/0041* (2013.01); *C04B 2103/0054* (2013.01); *C04B 2103/0096* (2013.01); *C04B 2111/34* (2013.01)

(58) Field of Classification Search
CPC .............. C04B 7/26; C04B 2103/0041; C04B 2103/0054; C04B 2103/0096; C04B 2111/34
See application file for complete search history.

(56) References Cited

U.S. PATENT DOCUMENTS

2004/0149174 A1    8/2004    Farrington et al.

FOREIGN PATENT DOCUMENTS

| CN | 103992444 A | 8/2014 |
| CN | 105110811 A | 12/2015 |
| CN | 105621930 A | 6/2016 |
| CN | 107352846 A | 11/2017 |
| CN | 108059382 A | 5/2018 |
| CN | 110627746 A | 12/2019 |
| JP | 2017071673 A | 4/2017 |

OTHER PUBLICATIONS

Internation Search Report of PCT/CN2018/080591, dated Mar. 27, 2018.
Tian, Yingfeng et al., "Study on Synthesis of a New Type of Modified Polyether Polycarboxylate Water Reducer Under Low Temperature", New Building Materials, vol. 40, No. 12, Dec. 25, 2013, ISSN: 1001-702X.

*Primary Examiner* — Anthony J Green

(57) ABSTRACT

Disclosed is a liquid regulator for ultra-dispersed, high-mud-resistance, high-foam-stability, low-shrinkage and enhanced autoclaved aerated concrete, which comprises the following ingredients in parts by weight: 75 parts to 85 parts of hyperdispersant; 5 parts to 10 parts of anti-mud agent; 1 part to 3 parts of shrinkage reducing ingredient; 10 parts to 20 parts of reinforcing ingredient; and 0.05 part to 0.1 part of foam stabilizing ingredient; and the invention further discloses a preparation and application thereof. By adding the liquid regulator into the autoclaved aerated concrete, the effects of ultra-dispersion, high mud resistance, high foam stability, low shrinkage and performance enhancement can be achieved.

4 Claims, No Drawings

LIQUID REGULATOR FOR ULTRA-DISPERSED, HIGH-MUD-RESISTANCE, HIGH-FOAM-STABILITY, LOW-SHRINKAGE AND ENHANCED AUTOCLAVED AERATED CONCRETE, AND PREPARATION METHOD AND APPLICATION THEREOF

CROSS-REFERENCE TO RELATED APPLICATIONS

This application is a continuation of International Patent Application No. PCT/CN2022/120791 with a filing date of Sep. 23, 2022, designating the United States, now pending, and further claims priority to Chinese Patent Application No. 202111129367.X with a filing date of Sep. 26, 2021. The content of the aforementioned applications, including any intervening amendments thereto, are incorporated herein by reference.

TECHNICAL FIELD

The present invention relates to the machining field of building materials, and particularly to a liquid regulator for ultra-dispersed, high-mud-resistance, high-foam-stability, low-shrinkage and enhanced autoclaved aerated concrete, and a preparation method and application thereof.

BACKGROUND OF THE PRESENT INVENTION

Autoclaved aerated concrete is quickly recognized by the market and widely used with the rise of assembly integration industry at the same time due to the advantages of light weight, heat insulation, sound insulation and noise reduction, high fire resistance limit, good shock resistance, green environmental protection and the like.

Silica sand, cement and lime are used as main raw materials of the autoclaved aerated concrete, wherein performance superior and inferior of the silica sand determine the design of a water-material ratio and the configuration of a cementing material amount during production of the autoclaved aerated concrete, determine crystal degree and quantity of tobermorite—a hydration product, and affect the physical and mechanical performances of the autoclaved aerated concrete at the same time.

Taking a certain area in southwest China as an example, due to the limitation of the lack of local natural quartz sand resources and the restriction of a cost factor, the silica sand is prepared and produced by breaking, screening and ball-milling (with a fineness of 200 meshes and a weight of screen residue of 20%±2%) weathered quartz miscellaneous feldspar, so that a water absorption is large due to a weathered structure, and a mud content reaches 10% to 20% at the same time, which seriously affect the diffusion performance of the prepared slurry and the reserve turnover of the slurry. A retarder is often added or the water-material ratio is improved to realize the working performance of the slurry during production, the volume stability of a concrete product is affected to a certain extent by a large mixing amount of cementing material for ensuring strength, and a production cost input is greatly increased at the same time, so that further application and promotion thereof are hindered.

CN102584099 A discloses a special mortar additive for autoclaved aerate concrete, the additive comprises the following ingredients in percentage by weight: 50% to 85% of cellulose ether, 5% to 40% of polycarboxylic acid water reducing agent, 10% to 40% of polyvinyl alcohol, and 0 to 20% of air entraining agent, and the ingredients are all powder, and uniformly stirred and mixed at normal temperature during preparation. The special mortar for aerated concrete prepared by this invention has the characteristics of reliable performance, low cost, water resistance, crack resistance, good compatibility, good cohesiveness, long opening time, easy construction operation and the like, and can meet the requirement of preparing the special mortar for aerated concrete on site.

CN110423042 A discloses a special mortar additive for autoclaved aerated concrete, the additive comprises the following ingredients in parts by mass: 1,540 parts of polycarboxylic acid water reducing agent, 1,035 parts of polyvinyl alcohol, 5,075 parts of cellulose ether, 525 parts of bentonite, 315 parts of glazed micro bead, and 20 parts of sodium abietate air entraining agent, may realize the characteristics of reliable performance, low cost, water resistance, crack resistance, good compatibility, good cohesiveness, long opening time, easy construction operation and the like, and can meet the requirement of preparing the special mortar for aerated concrete on site.

CN108017317 A discloses a waterproof high-strength admixture for autoclaved aerated concrete, which comprises the following ingredients: 12 parts of hydroxypropyl methyl cellulose, 12 parts of dispersible emulsion powder, 12 parts of lignocellulose, 510 parts of high-temperature-resistant anti-permeability agent, 7,080 parts of nano micro-silica powder, 12 parts of early strength agent, and 35 parts of anti-cracking agent; the waterproof high-strength admixture for autoclaved aerated concrete can improve frost resistance, anti-impermeability and corrosion resistance of concrete; and the concrete prepared by this invention has the advantages of high water reducing rate, low bleeding rate and higher concrete strength, well solves the problems of high strength and ultra-toughness required by the autoclaved aerated concrete, and has a wide market prospect.

CN 112573855 A discloses a low-density, high-strength and toughened admixture for autoclaved aerated concrete, and a preparation method and application thereof. The admixture comprises the following raw materials in parts by weight: 50 parts to 60 parts of superfine powder, 5 parts to 8 parts of alkali-active excitant, 10 parts to 15 parts of nano crystal modifier, and 1 part to 2 parts of aramid fiber. The ultrafine powder is ground for 20 minutes to 30 minutes, and then transferred into microspheres for grinding for 20 minutes to 30 minutes to obtain powder with a specific surface area greater than or equal to 700 m$^2$/kg; and the alkali-active excitant and the nano crystal modifier are added into the powder above for uniform mixing, and then the aramid fiber is added, and continuously and uniformly mixed to obtain the admixture. The admixture for autoclaved aerated concrete can ensure the requirement of mechanical performance of aerated concrete at a low density, and the phenomena of crack and unfilled corner during transportation of an aerated concrete product are avoided.

CN201410159508.6 discloses aerated concrete prepared from coal ash-nanosilicon dioxide-silica fume as main siliceous materials, comprising the following ingredients: cement, lime, gypsum, coal ash, nanosilicon dioxide, silica fume, a solid water reducer, a retarder, a foaming agent, a foam stabilizing ingredient, water glass, an oleic acid-triethanolamine binary mixed solution and water, and the formula is low in cost and simple in preparation process, and improves crystal degree and quantity of tobermorite—a hydration product of the aerated concrete, so that the thermal insulation performance and strength of the aerated concrete are both improved.

CN 101182173A discloses a key technical solution for promoting thermal insulation and material mechanical performance of aerated concrete, which belongs to the technical field of building envelope thermal insulation, and this invention promotes performances of the aerated concrete by two steps, so that the aerated concrete is capable of meeting the requirement of a national building energy conservation (50% to 80%) standard: a first step comprises improving a thermal insulation performance until a dry heat conductivity coefficient is smaller than or equal to 0.05 W/(m·K); and a second step comprises enhancing a material mechanical performance until a cube compressive strength is larger than or equal to 3.5 MPa, and larger than or equal to 2.0 MPa after 100 times of freeze thawing. The first step comprises: (1) minimizing a density of the aerated concrete; (2) maximizing a porosity; and (3) optimizing a pore structure. The second step comprises: (1) enhancing an additive; (2) enhancing fibers; (3) optimizing the coordination; (4) optimizing a normal-temperature stirring process; and (5) improving a maintenance method (comprising variable-pressure steam maintenance under CO % and surface maintenance with a strength agent at middle temperature under high humidity).

The autoclaved aerated concrete prepared by the invention patents above is improved in mechanics, toughness and thermal insulation performances, but does not relate to how to overcome an application of low-quality silica sand (with a multi-porosity and a high mud content) in a autoclaved aerated concrete product. Moreover, the invention patents above are mostly a powder product, with the defects of slow liquid phase dissolution rate, insufficient effect exertion and the like in use.

SUMMARY OF PRESENT INVENTION

The present invention aims to provide a liquid regulator for autoclaved aerated concrete, which is suitable for preparing the autoclaved aerated concrete with low-quality silica sand having a high porosity and a high mud content, and can increase a liquid phase dissolution rate and improve performances of the autoclaved aerated concrete in use.

Therefore, a technical solution used in the present invention is: a liquid regulator for ultra-dispersed, high-mud-resistance, high-foam-stability, low-shrinkage and enhanced autoclaved aerated concrete, which comprises the following ingredients in parts by weight: 75 parts to 85 parts of hyperdispersant; 5 parts to 10 parts of anti-mud agent; 1 part to 3 parts of shrinkage reducing ingredient; 10 parts to 20 parts of reinforcing ingredient; and 0.05 part to 0.1 part of foam stabilizing ingredient; wherein, preparation of the hyperdispersant comprises: mixing a monomer with water to obtain a solution A; mixing a reducing agent and a chain transfer agent with water to obtain a solution B; mixing polyether with water, heating the mixture, adding an initiator, stirring the mixture at normal temperature, adding the solution A and the solution B, heating and polymerizing the mixture, and adding a pH regulator to regulate a pH value to be 7 to 9, so as to obtain the hyperdispersant;

the hyperdispersant comprises the following ingredients in parts by weight: 20 parts to 40 parts of monomer; 0.2 part to 2 parts of reducing agent; 0.8 part to 4 parts of chain transfer agent; 160 parts to 200 parts of polyether; 2 parts to 5 parts of initiator; 5 parts to 8 parts of pH regulator; and 200 parts to 300 parts of water; and monomer is one or more of acrylic acid, acrylamide and aspartic acid; the reducing agent is one or more of vitamin C and sodium hypophosphite; the chain transfer agent is one or more of mercaptoacetic acid and mercaptopropionic acid; the polyether is one or more of methyl polyethylene glycol ether, allyl polyethylene glycol ether, 2-methylpropyl-2-alkenyl polyethylene glycol ether, 3-methylbutyl-3-alkenyl polyethylene glycol ether and 4-hydroxybutyl vinyl ether; the initiator is one or more of hydrogen peroxide and ammonium persulfate; and the pH regulator is one or more of sodium hydroxide and potassium hydroxide.

As a preferred option of the above solution, the anti-mud agent is one or more of quaternary ammonium salt clay stabilizer, potassium nitrate and diethylenetriamine penta (methylene phosphonic acid) heptasodium.

Preferably, the shrinkage reducing ingredient is one or more of anhydrous aluminum sulfate and anhydrous magnesium sulfate.

Preferably, the reinforcing ingredient is one or more of triethanolamine, triisopropanolamine, calcium formate, sodium carbonate and calcium nitrate.

Preferably, the foam stabilizing ingredient is one or more of polyacrylamide, polyvinyl alcohol, hydroxypropyl methyl cellulose, dispersible emulsion powder and polyethoxylated silicone emulsion.

Meanwhile, the present invention further provides a preparation method of the liquid regulator for ultra-dispersed, high-mud-resistance, high-foam-stability, low-shrinkage and enhanced autoclaved aerated concrete above, which comprises the following steps of:

step 1: preparing the hyperdispersant with a solid content of 40% to 45%, a water reducing rate of more than 45% and a pH value of 7 to 9; and step 2: sequentially adding the anti-mud agent, the shrinkage reducing ingredient, the reinforcing ingredient and the foam stabilizing ingredient into the hyperdispersant by weighing at a ratio, feeding each material at an interval of 25 minutes to 35 minutes, and stirring the mixture at normal temperature for 4.5 hours to 5 hours after feeding to obtain the liquid regulator for ultra-dispersed, high-mud-resistance, high-foam-stability, low-shrinkage and enhanced autoclaved aerated concrete.

The present invention further provides an application of the liquid regulator for ultra-dispersed, high-mud-resistance, high-foam-stability, low-shrinkage and enhanced autoclaved aerated concrete prepared on the above basis in preparation of the autoclaved aerated concrete.

As a preferred option of the above solution, a raw material of the applied autoclaved aerated concrete comprises the following ingredients in parts by weight: 400 parts to 450 parts of quartz miscellaneous feldspar milled fine powder, 90 parts to 110 parts of cement, 70 parts to 80 parts of lime, 20 parts to 30 parts of gypsum, 0.5 part to 1 part of aluminum powder paste, 350 parts to 370 parts of water, and 0.6 part to 0.8 part of regulator.

Further preferably, a preparation method of the applied autoclaved aerated concrete comprises the following steps of: adding the quartz miscellaneous feldspar milled fine powder, the cement, the lime and the gypsum into a high-speed stirrer for uniform stirring, then adding 328 parts to 335 parts of 80° C. water and regulator, and stirring the mixture at a rotating speed of 1000±50 r/min for 90 seconds to 120 seconds;

preparing the aluminum powder paste and 15 parts to 42 parts of 80° C. water into a suspension solution, adding the suspension solution into the high-speed stirrer, and continuously stirring the mixture at a high rotating speed of 1000±50 r/min for 40 seconds to 45 seconds; and pouring the slurry into a test mould after stirring, standing for maintaining at 45° C. to 55° C. for 2.5 hours to 3.5 hours, demoulding, sending into an autoclaved kettle at 180° C. to 200° C. under 1.1 MPa and 1.3 MPa for autoclaving for 10 hours to 12 hours, and cooling to obtain the autoclaved aerated concrete.

Beneficial effects of the present invention: a brand new self-developed and prepared hyperdispersant used is a polyether graft-copolymerization high-molecular surface active polymer, hydrophilic groups such as carboxyl (—COOH), hydroxyl (—OH), amino (—NHO and polyoxyalkyl (—O—R)n in a molecular structure thereof can reduce frictional resistance between cement particles and provide a dispersion performance for the cement particles through adsorption, dispersion, wetting and lubrication; meanwhile, a polycarboxylic acid substance is adsorbed on surfaces of the cement particles, so that electrostatic repulsion is produced between the cement particles and the cement particles are dispersed, leading to inhibition of an aggregation tendency of cement paste, increasing a contact area between the cement particles and water, and fully hydrating the cement; and in addition, molecules of the hyperdispersant are adsorbed on the surfaces of the cement particles in a "comb-type" structure, an adsorption layer is formed on a surface of a gel material, and when polymer molecular adsorption layers are close to and crossed with each other, physical space hindrance is produced between polymer molecular chains to prevent the cement particles from agglomerating, thus providing a hyperdispersion effect;

use of the hyperdispersant can greatly improve a diffusivity of slurry preparation of silica sand after ball milling, resist harmful adsorption to the regulator of mud powder and mud block in low-quality silica sand, release free water wrapped by agglomeration during ball milling, standing and normal-temperature stirring to the maximum extent, and improve formation and growth of a tobermorite structure to the maximum extent, so as to form a dense grid structure; and meanwhile, on the premise of ensuring a physical performance requirement of low-density aerated concrete, a water-binder ratio and a use amount of cementing material are greatly reduced, so as to reduce a cost and increase efficiency; and on this basis, the shrinkage reducing ingredient is added to greatly improve a volume stability of a concrete product during autoclaving by compensate shrinkage; the reinforcing ingredient is added to accelerate cement hydration, improve an autoclaved strength of the concrete product, effectively shorten an autoclaved curing time, reduce energy consumption, and improve an output rate; and the liquid regulator is added into the autoclaved aerated concrete, so as to achieve the effects of ultra-dispersion, high mud resistance, high foam stability, low shrinkage and performance enhancement.

DETAILED DESCRIPTION OF PREFERRED EMBODIMENTS

The present invention is further described hereinafter with reference to embodiments.

Embodiment 1

A liquid regulator for ultra-dispersed, high-mud-resistance, high-foam-stability, low-shrinkage and enhanced autoclaved aerated concrete comprised the following ingredients in parts by weight:

75 parts of hyperdispersant, 6 parts of quaternary ammonium salt clay stabilizer, 1 part of anhydrous aluminum sulfate, 10 parts of triethanolamine, and 0.05 part of hydroxypropyl methyl cellulose.

A preparation method of the liquid regulator for autoclaved aerated concrete above was as follows.

6 parts of quaternary ammonium salt clay stabilizer, 1 part of anhydrous aluminum sulfate, 10 parts of triethanolamine and 0.05 part of hydroxypropyl methyl cellulose were sequentially added into 75 parts of hyperdispersant, wherein a solid content of the hyperdispersant was 40%, a water reducing rate was 48%, and a pH value was 7. A feeding interval of each material was 30 minutes, and the mixture was stirred at normal temperature for 4.5 hours after feeding to obtain the liquid regulator for ultra-dispersed, high-mud-resistance, high-foam-stability, low-shrinkage and enhanced autoclaved aerated concrete.

The autoclaved aerated concrete was prepared by using the liquid regulator for autoclaved aerated concrete, comprising a formula and steps as follows.

415 parts of quartz miscellaneous feldspar milled fine powder, 92 parts of cement, 74 parts of lime and 21 parts of gypsum were added into a high-speed stirrer for uniform stirring, then 328 parts of 80° C. water and 0.64 part of regulator were added, and the mixture was stirred at a rotating speed of 1000±50 r/min for 120 seconds.

1 part of aluminum powder paste and 30 parts of 80° C. water were prepared into a suspension solution and added into the stirrer, and the mixture was continuously stirred at a high rotating speed of 1000±50 r/min for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

Embodiment 2

A liquid regulator for ultra-dispersed, high-mud-resistance, high-foam-stability, low-shrinkage and enhanced autoclaved aerated concrete comprised the following ingredients in parts by weight:

78 parts of hyperdispersant, 7 parts of diethylenetriamine penta(methylene phosphonic acid) heptasodium, 3 parts of anhydrous magnesium sulfate, 15 parts of triisopropanolamine, and 0.08 part of polyacrylamide.

A preparation method of the liquid regulator for autoclaved aerated concrete above was as follows.

7 parts of diethylenetriamine penta(methylene phosphonic acid) heptasodium, 3 parts of anhydrous magnesium sulfate, 15 parts of triisopropanolamine and 0.08 part of polyacrylamide were sequentially added into 78 parts of hyperdispersant, wherein a solid content of the hyperdispersant was 45%, a water reducing rate was 50%, and a pH value was 9. A feeding interval of each material was 30 minutes, and the mixture was stirred at normal temperature for 4.5 hours after feeding to obtain the ultra-high-performance liquid regulator for autoclaved aerated concrete.

The autoclaved aerated concrete was prepared by using the liquid regulator for autoclaved aerated concrete, comprising a formula and steps as follows.

426 parts of quartz miscellaneous feldspar milled fine powder, 97 parts of cement, 78 parts of lime and 26 parts of gypsum were added into a high-speed stirrer for uniform stirring, then 335 parts of 80° C. water and 0.65 part of regulator were added, and the mixture was stirred at a rotating speed of 1000±50 r/min for 100 seconds.

0.55 part of aluminum powder paste and 30 parts of 80° C. water were prepared into a suspension solution and added into the stirrer, and the mixture was continuously stirred at a high rotating speed of 1000±50 r/min for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

Embodiment 3

A liquid regulator for ultra-dispersed, high-mud-resistance, high-foam-stability, low-shrinkage and enhanced autoclaved aerated concrete comprised the following ingredients in parts by weight:

83 parts of hyperdispersant, 8 parts of potassium nitrate, 3 parts of anhydrous aluminum sulfate, 13 parts of calcium formate, and 0.06 part of polyvinyl alcohol.

A preparation method of the liquid regulator for autoclaved aerated concrete above was as follows.

8 parts of potassium nitrate, 3 parts of anhydrous aluminum sulfate, 13 parts of calcium formate and 0.06 part of polyvinyl alcohol were sequentially added into 83 parts of hyperdispersant, wherein a solid content of the hyperdispersant was 42%, a water reducing rate was 52%, and a pH value was 8. A feeding interval of each material was 30 minutes, and the mixture was stirred at normal temperature for 4.5 hours after feeding to obtain the ultra-high-performance liquid regulator for autoclaved aerated concrete.

The autoclaved aerated concrete was prepared by using the liquid regulator for autoclaved aerated concrete, comprising a formula and steps as follows.

438 parts of quartz miscellaneous feldspar milled fine powder, 105 parts of cement, 77 parts of lime and 25 parts of gypsum were added into a high-speed stirrer for uniform stirring, then 331 parts of 80° C. water and 0.7 part of regulator were added, and the mixture was stirred at a rotating speed of 1000±50 r/min for 120 seconds.

0.65 part of aluminum powder paste and 30 parts of 80° C. water were prepared into a suspension solution and added into the stirrer, and the mixture was continuously stirred at a high rotating speed of 1000±50 r/min for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

Embodiment 4

A liquid regulator for ultra-dispersed, high-mud-resistance, high-foam-stability, low-shrinkage and enhanced autoclaved aerated concrete comprised the following ingredients in parts by weight:

84 parts of hyperdispersant, 6 parts of quaternary ammonium salt clay stabilizer, 2 parts of anhydrous magnesium sulfate, 16 parts of sodium carbonate, and 0.07 part of dispersible emulsion powder.

A preparation method of the liquid regulator for autoclaved aerated concrete above was as follows.

6 parts of quaternary ammonium salt clay stabilizer, 2 parts of anhydrous magnesium sulfate, 16 parts of sodium carbonate and 0.07 part of dispersible emulsion powder were sequentially added into 84 parts of hyperdispersant, wherein a solid content of the hyperdispersant was 42%, a water reducing rate was 52%, and a pH value was 8. A feeding interval of each material was 30 minutes, and the mixture was stirred at normal temperature for 4.5 hours after feeding to obtain the ultra-high-performance liquid regulator for autoclaved aerated concrete.

The autoclaved aerated concrete was prepared by using the liquid regulator for autoclaved aerated concrete, comprising a formula and steps as follows. 438 parts of quartz miscellaneous feldspar milled fine powder, 110 parts of cement, 79 parts of lime and 28 parts of gypsum were added into a high-speed stirrer for uniform stirring, then 328 parts of 80° C. water and 0.8 part of regulator were added, and the mixture was stirred at a rotating speed of 1000±50 r/min for 120 seconds.

0.7 part of aluminum powder paste and 30 parts of 80° C. water were prepared into a suspension solution and added into the stirrer, and the mixture was continuously stirred at a high rotating speed of 1000±50 r/min for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

Embodiment 5

A liquid regulator for ultra-dispersed, high-mud-resistance, high-foam-stability, low-shrinkage and enhanced autoclaved aerated concrete comprised the following ingredients in parts by weight:

79 parts of hyperdispersant, 10 parts of quaternary ammonium salt clay stabilizer, 1 part of anhydrous magnesium sulfate, 19 parts of calcium nitrate, and 0.1 part of polyethoxylated silicone emulsion.

A preparation method of the liquid regulator for autoclaved aerated concrete above was as follows.

10 parts of quaternary ammonium salt clay stabilizer, 1 part of anhydrous magnesium sulfate, 19 parts of calcium nitrate and 0.1 part of polyethoxylated silicone emulsion were sequentially added into 79 parts of hyperdispersant, wherein a solid content of the hyperdispersant was 42%, a water reducing rate was 52%, and a pH value was 8. A feeding interval of each material was 30 minutes, and the mixture was stirred at normal temperature for 4.5 hours after feeding to obtain the ultra-high-performance liquid regulator for autoclaved aerated concrete.

The autoclaved aerated concrete was prepared by using the liquid regulator for autoclaved aerated concrete, comprising a formula and steps as follows. 438 parts of quartz miscellaneous feldspar milled fine powder, 110 parts of cement, 79 parts of lime and 28 parts of gypsum were added into a high-speed stirrer for uniform stirring, then 328 parts of 80° C. water and 0.8 part of regulator were added, and the mixture was stirred at a rotating speed of 1000±50 r/min for 120 seconds.

0.7 part of aluminum powder paste and 30 parts of 80° C. water were prepared into a suspension solution and added into the stirrer, and the mixture was continuously stirred at a high rotating speed of 1000±50 r/min for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

In Embodiment 1 to Embodiment 5 above, a preparation method of the hyperdispersant comprises: mixing a monomer with water to obtain a solution A; mixing a reducing agent and a chain transfer agent with water to obtain a solution B; mixing polyether with water, heating the mixture, adding an initiator, stirring the mixture at normal temperature, adding the solution A and the solution B, heating and polymerizing the mixture, and adding a pH regulator to regulate a pH value to be 7 to 9, so as to obtain the hyperdispersant.

The hyperdispersant comprises the following ingredients in parts by weight: 20 parts to 40 parts of monomer; 0.2 part to 2 parts of reducing agent; 0.8 part to 4 parts of chain transfer agent; 160 parts to 200 parts of polyether; 2 parts to 5 parts of initiator; 5 parts to 8 parts of pH regulator; and 200 parts to 300 parts of water.

Monomer is one or more of acrylic acid, acrylamide and aspartic acid; the reducing agent is one or more of vitamin C and sodium hypophosphite; the chain transfer agent is one or more of mercaptoacetic acid and mercaptopropionic acid; the polyether is one or more of methyl polyethylene glycol ether, allyl polyethylene glycol ether, 2-methylpropyl-2-alkenyl polyethylene glycol ether, 3-methylbutyl-3-alkenyl polyethylene glycol ether and 4-hydroxybutyl vinyl ether; the initiator is one or more of hydrogen peroxide and ammonium persulfate; and the pH regulator is one or more of sodium hydroxide and potassium hydroxide.

Comparative Example 426 parts of quartz miscellaneous feldspar milled fine powder, 97 parts of cement, 74 parts of lime and 22 parts of gypsum were added into a high-speed stirrer for uniform stirring, then 328 parts of 80° C. water were added, and the mixture was stirred at a rotating speed of 1000±50 r/min for 120 seconds.

0.5 part of aluminum powder paste and 30 parts of 80° C. water were prepared into a suspension solution and added into the stirrer, and the mixture was continuously stirred for 45 seconds.

The slurry was poured into a test mould after stirring, stood for maintaining at 50° C. for 3 hours, demoulded, sent into an autoclaved kettle at 190° C. under 1.2 MPa for autoclaving for 11 hours, and cooled to obtain the autoclaved aerated concrete.

All ingredients in Embodiment 1 to Embodiment 5 and Comparative Example were all in parts by weight.

Verification of Implementation Effect:

According to GB/T 11969-2008 "Test Method of Autoclaved Aerated Concrete", dry density and compressive strength tests of the aerated concrete prepared in Embodiment 1 to Embodiment 5 above and Comparative Example were carried out, and results were shown in Table 1.

TABLE 1

| Item | Dry density/(kg/m$^3$) | Compressive strength/MPa |
| --- | --- | --- |
| Embodiment 1 | 619 | 7.1 |
| Embodiment 2 | 621 | 6.8 |
| Embodiment 3 | 616 | 7.0 |
| Embodiment 4 | 622 | 7.2 |
| Embodiment 5 | 620 | 7.1 |
| Comparative Example | 614 | 5.2 |

It can be seen from data in Table 1 that the dry density of the autoclaved aerated concrete prepared in Embodiment 1 to Embodiment 5 is a B06 level, the compressive strength is higher than that required by a superior product A5.0, and an average value of the compressive strength can reach 7.2 MPa at most, which indicates that the autoclaved aerated concrete prepared by this method has a low-density enhancement effect.

We claim:

1. A liquid regulator for ultra-dispersed, high-mud-resistance, high-foam-stability, low-shrinkage and enhanced autoclaved aerated concrete, comprising the following ingredients in parts by weight: 75 parts to 85 parts of hyperdispersant; 5 parts to 10 parts of anti-mud agent; 1 part to 3 parts of shrinkage reducing ingredient; 10 parts to 20 parts of reinforcing ingredient; and 0.05 part to 0.1 part of foam stabilizing ingredient;

wherein, preparation of the hyperdispersant comprises: mixing a monomer with water to obtain a solution A; mixing a reducing agent and a chain transfer agent with water to obtain a solution B; mixing polyether with water, heating the mixture, adding an initiator, stirring the mixture at normal temperature, adding the solution A and the solution B, heating and polymerizing the mixture, and adding a pH regulator to regulate a pH value to be 7 to 9, so as to obtain the hyperdispersant;

the hyperdispersant comprises the following ingredients in parts by weight: 20 parts to 40 parts of monomer; 0.2 part to 2 parts of reducing agent; 0.8 part to 4 parts of chain transfer agent; 160 parts to 200 parts of polyether; 2 parts to 5 parts of initiator; 5 parts to 8 parts of pH regulator; and 200 parts to 300 parts of water;

the monomer is one or more of acrylic acid, acrylamide and aspartic acid; the reducing agent is one or more of vitamin C and sodium hypophosphite; the chain transfer agent is one or more of mercaptoacetic acid and mercaptopropionic acid; the polyether is one or more of methyl polyethylene glycol ether, allyl polyethylene glycol ether, 2-methylpropyl-2-alkenyl polyethylene glycol ether, 3-methylbutyl-3-alkenyl polyethylene glycol ether and 4-hydroxybutyl vinyl ether; the initiator is one or more of hydrogen peroxide and ammonium persulfate; and the pH regulator is one or more of sodium hydroxide and potassium hydroxide;

the shrinkage reducing ingredient is one or more of anhydrous aluminum sulfate and anhydrous magnesium sulfate; and the reinforcing ingredient is one or more of triethanolamine, triisopropanolamine, calcium formate, sodium carbonate and calcium nitrate.

2. The liquid regulator for ultra-dispersed, high-mud-resistance, high-foam-stability, low-shrinkage and enhanced autoclaved aerated concrete according to claim 1, wherein the anti-mud agent is one or more of quaternary ammonium salt clay stabilizer, potassium nitrate and diethylenetriamine penta(methylene phosphonic acid) heptasodium.

3. The liquid regulator for ultra-dispersed, high-mud-resistance, high-foam-stability, low-shrinkage and enhanced autoclaved aerated concrete according to claim 1, wherein the foam stabilizing ingredient is one or more of polyacrylamide, polyvinyl alcohol, hydroxypropyl methyl cellulose, dispersible emulsion powder and polyethoxylated silicone emulsion.

4. A preparation method of the liquid regulator for ultra-dispersed, high-mud-resistance, high-foam-stability, low-shrinkage and enhanced autoclaved aerated concrete according to claim 1, comprising the following steps of:

step 1: preparing the hyperdispersant with a solid content of 40% to 45%, a water reducing rate of more than 45% and a pH value of 7 to 9; and step 2: sequentially adding the anti-mud agent, the shrinkage reducing ingredient, the reinforcing ingredient and the foam stabilizing ingredient into the hyperdispersant by weighing at a ratio, feeding each material at an interval of 25 minutes to 35 minutes, and stirring the mixture at normal temperature for 4.5 hours to 5 hours after feeding to obtain the liquid regulator for ultra-dispersed, high-mud-resistance, high-foam-stability, low-shrinkage and enhanced autoclaved aerated concrete.

\* \* \* \* \*